United States Patent Office 2,801,996
Patented Aug. 6, 1957

2,801,996
METALLIZED AZO PIGMENT

Alfred Siegel, Summit, and Godfrey Grimm, Short Hills, N. J., assignors to E. I. du Pont de Nemours & Company, Wilmington, Del., a corporation of Delaware No Drawing. Application August 13, 1953,
Serial No. 374,104

4 Claims. (Cl. 260—146)

This invention relates to improved metallized azo pigments and more particularly to metallized azo pigments exhibiting improved resistance to bleeding in solvents ordinarily present in coating compositions in which such pigments are employed.

U. S. 2,396,327 discloses new, highly useful metallized azo pigments of high stability which comprise metal complexes of azo dyes obtained by coupling a diazotizable aryl amine which is devoid of hydroxy groups ortho to the diazo group, sulfonic acid and carboxy groups, with a compound of the 4-hydroxy-2-pyridone series to obtain a symmetrical azo pigment corresponding to the formula

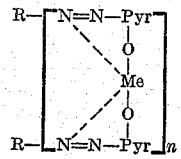

wherein each R is the nucleus of a diazotizable cyclic amine which is devoid of a hydroxy group ortho to the azo bridge, sulfonic acid and carboxylic groups, $n$ is 1 to 2, Me is a divalent metal having an atomic number of 24 to 30, and Pyr-O- is the residue of a compound of the 4-hydroxy-2-pyridone series, such as 4-hydroxy-2-quinolone, 4-hydroxy-N-methyl-2-quinolone, 4-hydroxy-7,8-benzo-quinolone or their tautometric forms, such as 2,4-dihydroxy quinoline. One particularly useful pigment of this series comprises the nickel complex of the azo dye obtained by coupling diozotized amine para chloro aniline with 2,4-dihydroxy quinoline. The pigment obtained is quite transparent, to thus contribute to the "flash" or "two-tone" presently desired in automotive finishes. It is greenish yellow in hue; has high strength; and is remarkably fast to light when compared with other yellow pigments. In fact, it is a yellow pigment with a combination of properties which renders it highly acceptable for blending with phthalocyanine pigments to give yellower shades of green having essentially phthalocyanine properties.

In spite of these desirable properties, which have led to substantial commercialization of the products of the patent, especially the nickel complex referred to, their use has been markedly limited in some applications because of a significant, undesired solubility in many organic solvents, particularly the hydrocarbon solvents, both aliphatic and aromatic, commonly employed in lacquers and enamels. This solubility can be conveniently shown by shaking up some of the pigment with the solvent and filtering out the solid. A colored filtrate is evidence of solubility or bleeding. It can also be observed in actual use when a second composition such as a white paint is applied as an overstripe completely hiding the original yellow enamel and the yellow color bleeds through into the white overstripe.

It is an object of this invention to overcome the foregoing deficiency of the nickel complexes of the azo dyes referred to, and to provide novel pigments having the tinctorial properties of the products of said U. S. Patent 2,396,327, but which are improved with respect to bleeding resistance, particularly into overstripe lacquers and enamels. A particular object is to improve the bleed resistance of the nickel complex of the azo dye from a diazotized arylamine of the type referred to with a compound of the 4-hydroxy-2-pyridone series, such as 2,4-dihydroxy quinoline. Further objects and advantages of the invention will be apparent from the ensuing description thereof.

These and other objects are accomplished in this invention which comprises treating the metal complexes obtained from a practice of the disclosure of U. S. 2,396,327 with a copper salt subsequent to the formation of the original metal, and especially the nickel, complex.

In one practical embodiment of the invention, para chloro aniline, or other diazotizable arylamine of the type contemplated in the aforesaid patent, is diazotized and coupled with 2,4-dihydroxy quinoline, or other compound of the 4-hydroxy-2-pyridone series referred to, and is then converted to the nickel complex by treatment with a soluble nickel salt such as nickel ammonium sulfate, as more fully described in U. S. Patent 2,396,327. In the conversion, a proportion of 1 mole equivalent of the metal to 2 mole equivalents of the pyridone radical is used. In accordance with this invention, instead of isolating the pigment at this point, the suspension is further treated with a solution of a soluble copper salt, such as copper ammonium sulfate, and is then isolated in the normal manner to obtain an azo pigment represented by the formula:

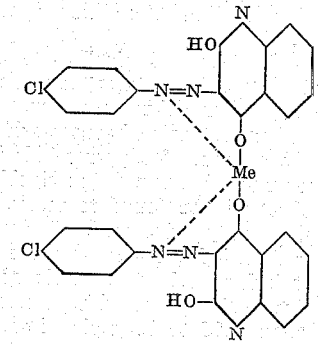

wherein about 75% of the Me is nickel and about 25% of the Me is copper, and the total Me is about 100% of theoretical, said pigment being characterized by an improved resistance to bleeding in hydrocarbon solvents as compared to the similar pigment in which Me is only nickel.

To a clearer understanding of the invention, the following specific example is given which is merely in illustration but not in limitation of the invention:

Example 128 parts of p-chloro aniline (1 mole) is dissolved in about 2500 parts of warm water containing 90 parts of HCl (100%). After cooling to 0° C., the solution is diazotized by adding a water solution of 70 parts of sodium nitrate and stirring for 15 minutes.

In a separate container, 169 parts of 2,4-dihydroxy quinoline is dissolved in about 1600 parts of warm water containing 42 parts of sodium hydroxide and 53 parts of sodium carbonate and then adjusted with ice and water to a total volume of 4000 parts at a temperature of 15° C.

Coupling is effected by running the cold diazo solution beneath the surface of the coupling vat in about one hour while maintaining the temperature of the coupling vat at 15° C. The volume is then adjusted to 14,000 parts and the dye suspension is heated to 80° C. in about 30 minutes and held at that temperature for about 30 minutes.

The nickel complex is prepared by adding in 20-25 minutes to the hot dye suspension a solution of nickel ammonium sulfate, prepared by dissolving 151 parts of nickel sulfate (NiSO₄.6H₂O) in 1400 parts of water and adding 78 parts of aqueous ammonia (28% NH₄OH), and continuing to stir at about 80° C. for about 1.5 hours.

In accordance with this invention, there is added in about 20 minutes to the hot suspension of the nickel complex, a solution of copper ammonium sulfate, prepared by dissolving 84 parts of copper sulfate (CuSO₄.5H₂O)

in 850 parts of water and adding 38 parts of aqueous ammonia (28% NH₄OH), and continuing to stir at about 80° C. for about 1.5 hours.

The pigment suspension is then cooled by diluting with cold water, filtered, washed free of soluble salts, dried and pulverized. The yield is 380 parts of a greenish yellow pigment. Analysis of this pigment shows that the combined content of nickel and copper is substantially the theoretical amount for 100% metallization of the dye. About 75% of the metal content is nickel and about 25% is copper. When formulated into a coating composition and applied to a metal surface, as in an automotive finish, the pigment shows a marked reduction in the amount of color which bleeds into a white overstripe enamel when compared with the equivalent pigment which is not after-treated with copper.

In attaining the benefits of this invention, the contemplated copper treatment must be applied after the metallization or the nickel complexing of the dye to insoluble state. Coprecipitation with both metals in the same solution proves ineffective for such purpose, as does a reversal of the order of metal addition, i. e., by adding the copper first.

The amount of copper "topping" agent used is not critical and will vary with the extent of unmetallized dye present in the original metallized complex. In the foregoing example, about ⅓ mole of copper sulfate has been used. When the amount of copper salt is increased to double that shown in said example, no significant change or beneficial effect will be found to result. In fact, a severe economic penalty is incurred. Reduction to one-half of such amount induces a serious loss in effectiveness. In general, from 0.2 to 1.0 mole of copper salt per mole of dye can be used with preferred amounts ranging from about 0.25 to 0.5 mole of copper salt per mole of dye.

The particular salt of copper used in the invention is a matter of choice and convenience. While copper sulfate has been employed in the example, other soluble copper salts, including the chloride, bromide, nitrite, or acetate, as well as mixtures thereof, can be used in equivalent amounts and with substantially equal success.

In effecting the contemplated copper after-treatment, the presence of a mildly alkaline "acid acceptor" is required. In the above example, ammonia fills this role but other acid acceptors, such as diethanolamine, aniline, urea, propyl amine, mono-, di-, and trimethylamine, ethylamine, formamide, etc., can be used as can alkaline compounds generally which will combine with the free acid as it is liberated from the inorganic salt so that as the metallization proceeds the metallization medium will be maintained at a pH above 6.5.

The time and temperature used in the copper topping operation can be varied considerably. In general, temperatures ranging from, say, 50-100° C., can be resorted to, with temperatures of 75-90° C. being preferred.

The insoluble pigments of this invention advantageously exhibit improved resistance to bleeding, contain a higher total metal content, and, in the case of treating the simple nickel complex obtained in accordance with U. S. 2,396,327, are free from an undesired deficiency of complexing metal, i. e., the patent product contains only about 75% of the calculated amount of nickel. As noted, modifying the process of the patent, as by resorting to co-precipitation or other procedures, proves to be unsuccessful in introducing more than such indicated amount of nickel into the dye. Advantageously, the present after-treatment effectively overcomes this difficulty and affords introduction of an additional insolubilizing metal to provide a total of nickel and copper content in the final pigment approximating the desired theoretical. Why this cannot be done through recourse to additional nickel, or why the copper in contrast to other metals largely insolubilizes the unmetallized soluble residue of the dye is not presently understood. It is clear, however, that prior attempts to overcome this deficiency have proved unsuccessful.

While the invention is particularly useful and effective in improving a nickel complex obtained in accordance with the procedures of U. S. Patent 2,396,327, it will be understood that after-treatment with a copper salt of other metallized products of said patent, including those of cobalt, chromium, iron, manganese, calcium, barium, strontium, cadmium, and zinc, is also contemplated.

The products of this invention are useful as insoluble pigments, with particular application in the manufacture of coating compositions adapted for automotive finishing purposes, including alkyd resin enamels, modified alkyd resin enamels, formaldehyde resin enamels, resin-modified phenol formaldehyde resin enamels, or other suitable synthetic resin enamels, or nitrocellulose or other cellulose derivative adapted to provide unique automotive coatings. They are also useful in the pigment coloration of textile fibers, both in pigment printing processes wherein the pigment is held on the textile by a binder, and processes wherein a pigment is incorporated in the spinning solutions prior to spinning of artificial textile fibers, including viscose rayon, cellulose acetate, nylon, and acrylic type fibers.

We claim as our invention:

1. An improved bleed-resistant azo pigment having the formula

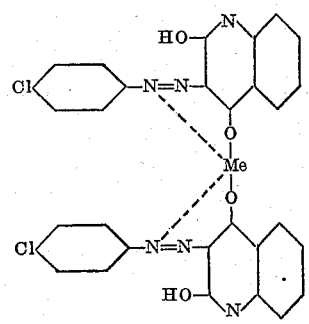

wherein Me is about 75% nickel and about 25% copper, and the total thereof is about 100% of theoretical.

2. A method for imparting improved bleed resistance characteristics to an azo pigment having the formula

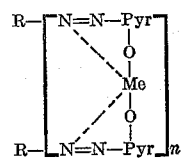

wherein each R is the nucleus of a diazotizable cyclic amine which is devoid of a hydroxy group ortho to the azo bridge, sulfonic acid and carboxylic groups, $n$ is 1 to 2, Me is a divalent metal other than copper having an atomic number of 24 to 30, and Pyr-O- is the residue of a dihydroxy-quinoline compound, which comprises incorporating 0.2 to 1.0 mol of a copper salt for each mol of said azo pigment into an aqueous suspension of said pigment in the presence of an acid acceptor and recovering the resulting pigment from the aqueous medium.

3. A method for imparting improved bleed resistance properties to an azo pigment having the formula

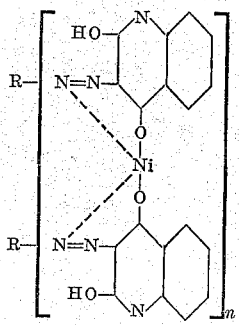

wherein R is the nucleus of a diazotizable cyclic amine which is devoid of a hydroxy group ortho to the azo bridge, sulfonic acid and carboxylic acid groups, and $n$ is 1 to 2, which comprises incorporating 0.2 to 1.0 mol of a copper salt for each mol of said azo pigment into an aqueous suspension of said pigment in the presence of an acid acceptor and recovering the resulting pigment from the aqueous medium.

4. A method for preparing an improved bleed-resistant azo pigment having the formula

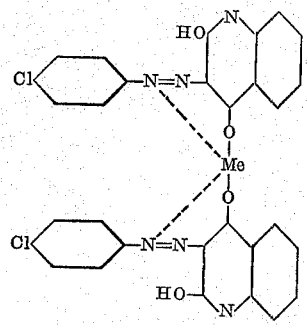

wherein about 75% of the Me is nickel and about 25% thereof is copper, and the total Me is about 100% of theoretical, which comprises preparing the nickel complex thereof and then incorporating 0.2 to 1.0 mol of a copper sulfate for each mol of said azo pigment into an aqueous suspension of said pigment in the presence of an acid acceptor and recovering the resulting pigment from the aqueous medium.

References Cited in the file of this patent
UNITED STATES PATENTS

| | | |
|---|---|---|
| 1,994,116 | Straub et al. | Mar. 12, 1935 |
| 2,363,905 | Libby et al. | Nov. 28, 1944 |
| 2,396,327 | Kvalnes et al. | Mar. 12, 1946 |
| 2,431,190 | Morgan | Nov. 18, 1947 |